United States Patent
Dresevic et al.

(10) Patent No.: US 6,751,726 B1
(45) Date of Patent: Jun. 15, 2004

(54) METHOD AND SYSTEM FOR LOADING FONTS BY CACHING FONT-LOADING INFORMATION

(75) Inventors: Bodin Dresevic, Bellevue, WA (US); Hock San Lee, Redmond, WA (US); Yung-Jen Tony Tsai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,967

(22) Filed: Dec. 15, 1999

(51) Int. Cl.[7] .................................................. G06F 9/24
(52) U.S. Cl. ........................... 713/1; 358/1.11; 707/200
(58) Field of Search ............................. 713/1; 345/467; 400/61; 707/200; 358/1.11

(56) References Cited

U.S. PATENT DOCUMENTS

| | | | | |
|---|---|---|---|---|
| 4,887,204 A | * | 12/1989 | Johnson et al. | 345/467 |
| 5,477,476 A | * | 12/1995 | Schanin et al. | 713/324 |
| 5,590,260 A | * | 12/1996 | Morse et al. | 345/467 |

FOREIGN PATENT DOCUMENTS

JP        08212198 A  *  8/1996  ........... G06F/17/21

OTHER PUBLICATIONS

32IFIMET.H (OS/2 Intelligent Font Interface). 1989. Microsoft Corporation.*

"Mechanisms for Finding Substitute Fonts in a Conference-Enabled X Windows Application". IBM Technical Disclosure Bulletin, Jan. 1998, US. vol. 41, isssue 1. pp. 137–142.*

"Microsoft Windows NT Server, Terminal Server Edition, Version 4.0: An Architectural Overview", Microsoft Corporation, 1998.

IFIMetrics document.

* cited by examiner

Primary Examiner—Thomas Lee
Assistant Examiner—Eric Chang
(74) Attorney, Agent, or Firm—Leydig, Voit & Mayer, Ltd.

(57) ABSTRACT

A method and system for efficiently loading fonts at the boot time of a computer uses a cache file to store font-loading information for the installed fonts. The font-loading information is extracted from the font files by associated font drivers and stored in the font-loading information cache when the fonts were installed. During the boot time of the computer, for each installed font, an associated font driver determines whether the font-loading information for that font has been stored in the font-loading information cache. If the font-loading information is in the cache, the font driver retrieves the font-loading information from the cache, without having to open the font file.

14 Claims, 7 Drawing Sheets

METHOD AND SYSTEM FOR LOADING FONTS BY CACHING FONT-LOADING INFORMATION

TECHNICAL FIELD OF THE INVENTION

This invention relates generally to the use of fonts by a computer for display-and printing, and more particularly to the process of loading fonts during the initialization of an operating system.

BACKGROUND OF THE INVENTION

Various font technologies are used today in operating systems for the display of text on output devices, such as computer display screens and printers. Examples of commonly used font technologies include TrueType fonts, Post-Script fonts, bitmap fonts, and vector fonts.

With the significant improvements in computer hardware and software capabilities in the past decade, a computer nowadays may support a large number of fonts for different languages. Font-intensive applications, such as word processors and desktop or web publishing applications, may require thousands of fonts to be loaded on a computer. To simplify the task of loading font data each time the computer is booted, some operating systems allow "permanent" installation of fonts, i.e., the computer will automatically load the permanently installed fonts during the boot time. To that end, the path to the font file of each installed font may e stored in a file or in the Registry of the operating system. During the boot time, the operating system goes through the list of installed fonts and retrieves information from each of the font files and makes the fonts available to applications. The operation of retrieving information from the font files so that the fonts can be later used by the operating system for display or printing is commonly referred to as "loading" the fonts.

Depending on the font technologies used, the font loading operation can be quite time consuming. To load a font, the operating system needs to first determine the type of the font by doing at least basic consistency checking of the structure of the font. Moreover, to actually load the font, the operating system needs to extract information from the font file that enables it to use the font, and store the extracted information in the system memory for quick access. The extraction of information from a font file may involve reading the entire font file and performing intensive calculations on the data in the font file. Reading data from disk files, however, is a very slow I/O operation. Thus, a significant amount of time may be spent on reading font files during the font-loading process, especially when the information needed from a font file is scattered randomly on a mass storage device with a long access time, such as a hard disk. This is especially the case for Fast East fonts, the font files of some of which may be up to 20 megabytes (MB) in size. With a large font file, many "pages" (i.e., chunks of a predefined size, such as 4 KB) need to be read into the computer memory from the disk in order to extract all the information that is needed by the operating system.

When a large number, such as a few thousands, of fonts are to be loaded, the process of extracting information from the font files can take a long time, sometimes on the order of tens of minutes. Because loading fonts is part of the computer boot process, the slow font-loading process significantly lengthens the time required to boot the computer. To many computer users, it is a great annoyance to have to wait for a long time for the computer to boot itself.

SUMMARY OF THE INVENTION

In view of the foregoing, the present invention provides a method and system for efficiently loading fonts at the boot time of a computer or when an instance of the graphics component of the operating system is initialized. In accordance with the invention, a font-loading information cache file is provided for storing font-loading information of fonts installed on the computer. The font-loading information, which is needed by the operating system to be able to use the fonts, is extracted and/or calculated from the font file for each installed font and stored in the font-loading cache when that font was installed. During the boot time of the computer, the operating system goes through the list of installed fonts. For each installed font, the operating system requests an associated font driver to load the font. The font driver determines whether the font-loading information for that font has been stored in the font-loading information cache file. If the font-loading information for the font is in the cache file, the font driver retrieves the information from the cache file for use by the operating system. This font-loading information caching scheme is also applicable in a remote terminal server system where an instance of the graphic component of the operating system is initialized and the installed fonts are reloaded for each remote terminal session.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in-both local and remote memory storage devices.

Figure 1:
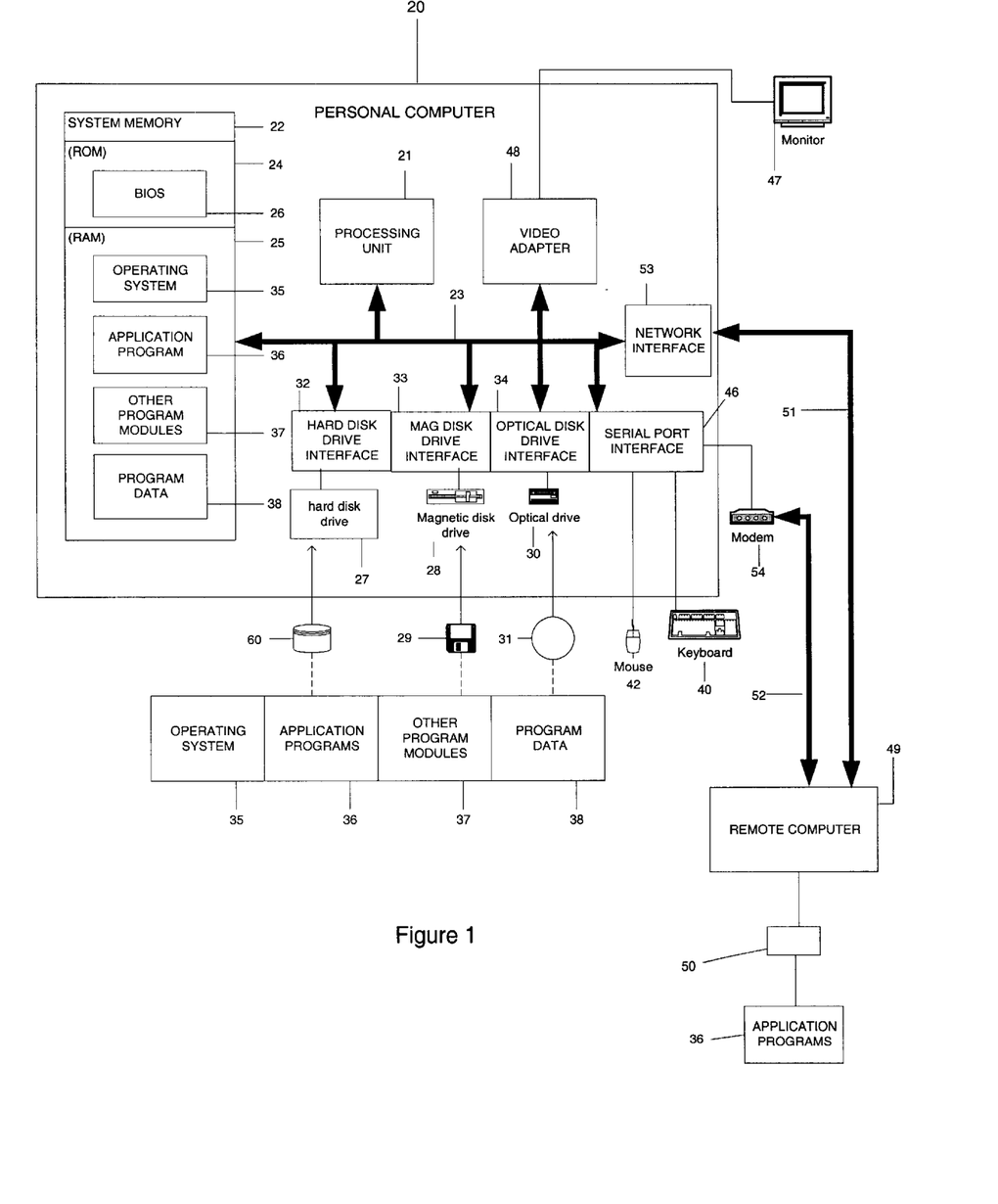
FIG. 1 is a block diagram generally illustrating an exemplary computer system that may be used to implement the method and system of loading fonts according to the invention.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system-bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means, such as a cable modem connected to a cable network, for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
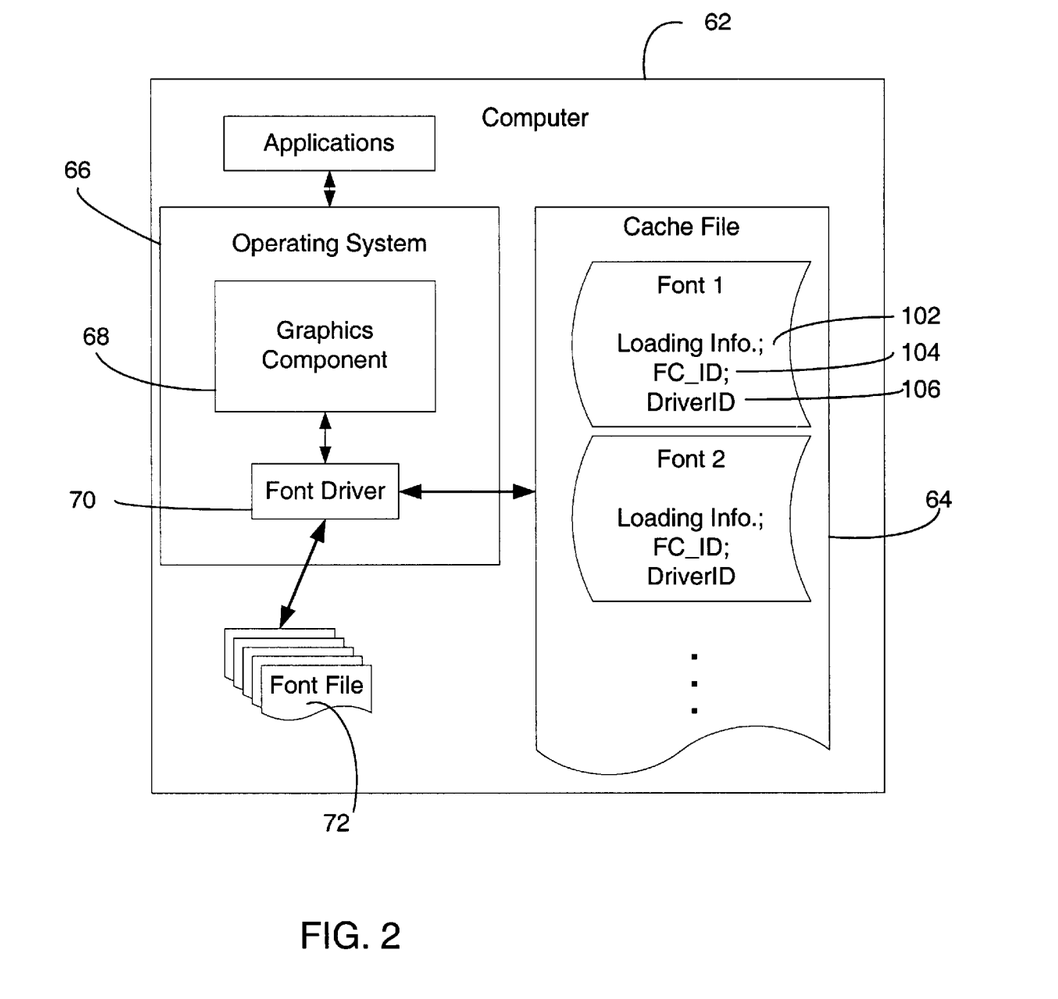
FIG. 2 is a schematic diagram showing architecture of a computer system implementing font-loading information caching of the invention.

Referring now to FIG. 2, the present invention is directed to a method and system for efficiently loading fonts that have been installed on a computer 62 to significantly reduce the time required to load the fonts. Depending on the font technologies used and the sizes of font files, extracting from a font file the font-loading information needed by the operating system can be rather time consuming. The invention avoids the need to go to the font file of each of the installed fonts and extract the loading information by using a font-loading information cache 64 to store the loading information of installed fonts. The invention also provides an architecture that allows the font-loading caching scheme to be applicable to various fonts regardless of the underlying font technologies of the fonts. In this architecture, the operating system 66 has a graphics component 68 that handles fonts and other graphics operations of the system. The operating system 66 further includes a font driver 70 for loading fonts. To that end, the font driver 70 is capable of reading the data in a font file 72 to extract font-loading information needed by the operating system to use the font. In accordance with the invention, the font driver stores the font-loading information for an installed font in the font-loading information cache file 64. In a boot process, the graphics component 68 requests the font driver 70 to provide the font-loading information for an installed font. The font driver 70 checks the cache file 64 to see whether the font-loading information for that font is already cached. If so, the font driver 70 retrieves the font-loading information from the cache file without having to open and read the font file.

Figure 3:
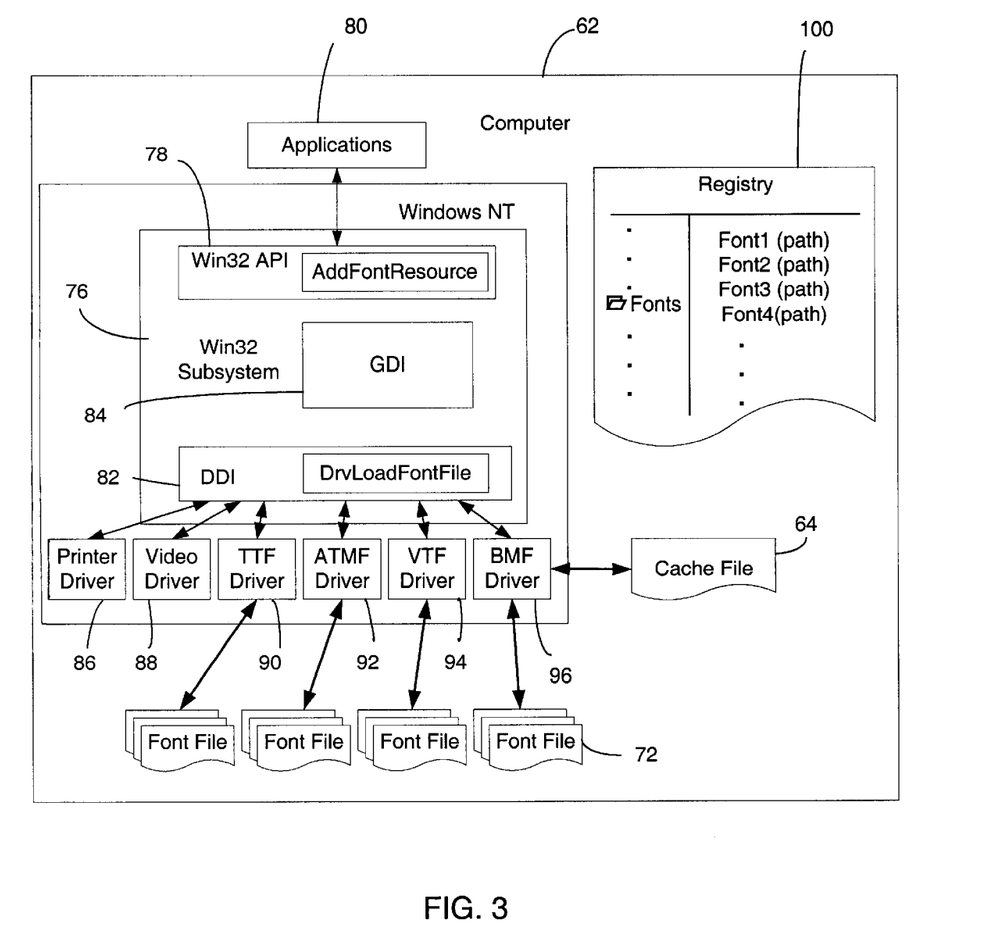
FIG. 3 is a schematic diagram showing an embodiment of an operating system for implementing a font-loading information caching scheme in accordance with the invention.

In a preferred embodiment, the caching of font-loading information according to the invention is implemented in the framework of the Windows NT operating system of Microsoft Corporation. It will be appreciated, however, that the invention is also applicable to other operating systems for loading fonts. As shown in FIG. 3, the Windows NT operating system 74 includes a Win32 subsystem 76. The Win32 subsystem 76 provides an application programming interface (API) 78, which comprises a set of routines used by application programs 80 to request and carry out lower-level services performed by the operating system.

The Win32 subsystem includes a component called graphics device interface (GDI) 84, which offers graphics functionality to the applications. To that end, the GDI provides a set of API routines for drawing lines, curves and other graphics as well as text on graphics output devices. The GDI also interfaces to device drivers for output devices, such as printers and displays, through a device driver interface (DDI). For example, FIG. 3 shows a video display driver 86 and a printer driver 88. Besides the device drivers for output devices, the GDI further interfaces with one or more font drivers. Typically, there is one font driver for each of the font technologies supported by the operating system. For instance, FIG. 3 shows four font drivers, including a TrueType font driver 90, an Adobe Type Manager (ATM) font driver 92, a Bitmap font driver 94, and a Vector font driver 96. The ATM font driver provides support for PostScript fonts. The Bitmap font driver provides support for simple Raster or Bitmap fonts. The Vector font driver provides support for vector fonts. The data for each font is stored in a font file, which may reside on a mass storage device, such as a hard disk, of the computer.

In accordance with an aspect of the invention, a plurality of fonts may be "installed" on the computer. A font that is "installed" will be automatically loaded by the operating system during the boot time. Depending on the memory configuration and the sizes of the font files, the number of fonts that can be loaded may be in the thousands. To manage the installation of fonts, a list of the installed fonts may be stored in a file or the like. In the embodiment of FIG. 3 based on the Windows NT framework, the list of the installed fonts is stored in the Registry 100 of the operating system.

In the embodiment of FIG. 3, the installation of a new font on the computer system-requires two operations to be performed. First, an AddFontResource routine, which is a GDI routine, is called to load the font. The path of the font file for that font is passed to the AddFontResource routine as an argument. If the AddFontResource call is successful, the font is loaded and becomes available to applications running on the computer. The second operation involves storing the font file path in the Registry 100. This is done so that the next time the computer system is booted, the code initialing the Win32 component can read the list of all installed fonts from the Registry and call the AddFontResource routine to load every font in the list. In this way, after the boot is complete, the fonts listed in the Registry are available to the applications.

The loading of a font can be a rather time-consuming task. By way of example, in the embodiment of FIG. 3, the loading of a font is performed by calling the AddFontResource routine, with the path of the font file as an argument. Because the operating system needs to determine the type of the font, the AddFontResource call "offers" the font file to all of the installed font drivers in a predetermined order until one font driver that understands the format of the font "agrees" to load the font. For a font driver to recognize the font, it may have to do at least basic consistency checks on the structure of the font file. To actually load the font, the font driver has to extract from the font file information that is needed by the operating system, and store such information in the system memory so that it can be accessed quickly. The information that is to be extracted from a font file by the font driver in order to load the font is referred to as the "font-loading information." To extract the font-loading information, the font driver may need to read the entire font file and perform some calculations to generate the font-loading information. Since some font files may be very large and the number of fonts to be loaded can be in the thousands, the process of loading all of fonts can take a long time to complete, if the font-loading information for each installed font has to be extracted from the font file at that time.

In accordance with a feature of the invention, a significant reduction of the time needed to load the installed fonts at system boot time is achieved by storing the font-loading information for the fonts in a font-loading information cache file 64. During boot time, when a font is to be loaded, the cache file 64 is first checked to see whether the font-loading information is already stored therein. If so, the font-loading information is retrieved from the cache file and used to load the font, without opening and reading the font file 72. In this way, instead of having to read in a large font file and perform time-consuming calculations, the operating system needs only to make a quick access to the relatively small cache file, resulting in significant saving in time.

The font-loading information to be stored in the cache 64 for a given font depends on the font technology of the font and may also depend on the design of the operating system. For example, in the existing framework of Windows NT of Microsoft Corporation, loading a font requires the font driver to provide two data structures called IFIMETRICS and FD_GLYPHSET, respectively. The IFIMETRICS structure defines all the information for a given typeface that the GDI can understand, including, for example, the font technology on which the font is based, the Windows ascender and descender values for the font, the suggested character width and height, etc. The FD_GLYPHSET structure describes how the Unicode code points described by the glyphs of the font correspond to the glyph indices of the glyphs. The size of the FD_GLYPHSET depends on the number of characters in the font and can therefore vary significantly for different fonts. To generate the IFIMETRICS and FD_GLYPHSET structures, the font driver has to read the font file and extract data therefrom. As described above, such operation can be rather time-consuming.

In accordance with the invention, the font-loading information for an installed font is cached in the cache file 64 so that it is available for the next booting process. It will be appreciated that the exact font-loading information for a given font to be stored in the font-loading information cache file 64 may depend on various factors, and the invention is not limited to any particular contents and format of the cache file. What is important is that by referencing the cache file, a font driver can avoid the time-consuming task of reading the font file and extracting information therefrom by simply retrieving the information it needs from the cache file to load the font.

In a preferred embodiment, as shown in FIG. 2, for each installed font, the cache file 64 stores the font-loading information 102 for that font, a font-caching ID 104, and a font-driver ID 106. The font-caching ID identifies the font to which the font-loading information belongs. The font driver ID identifies the font driver that supports the font. The use of these data in a font-loading process will be described in greater detail below.

Figure 4:
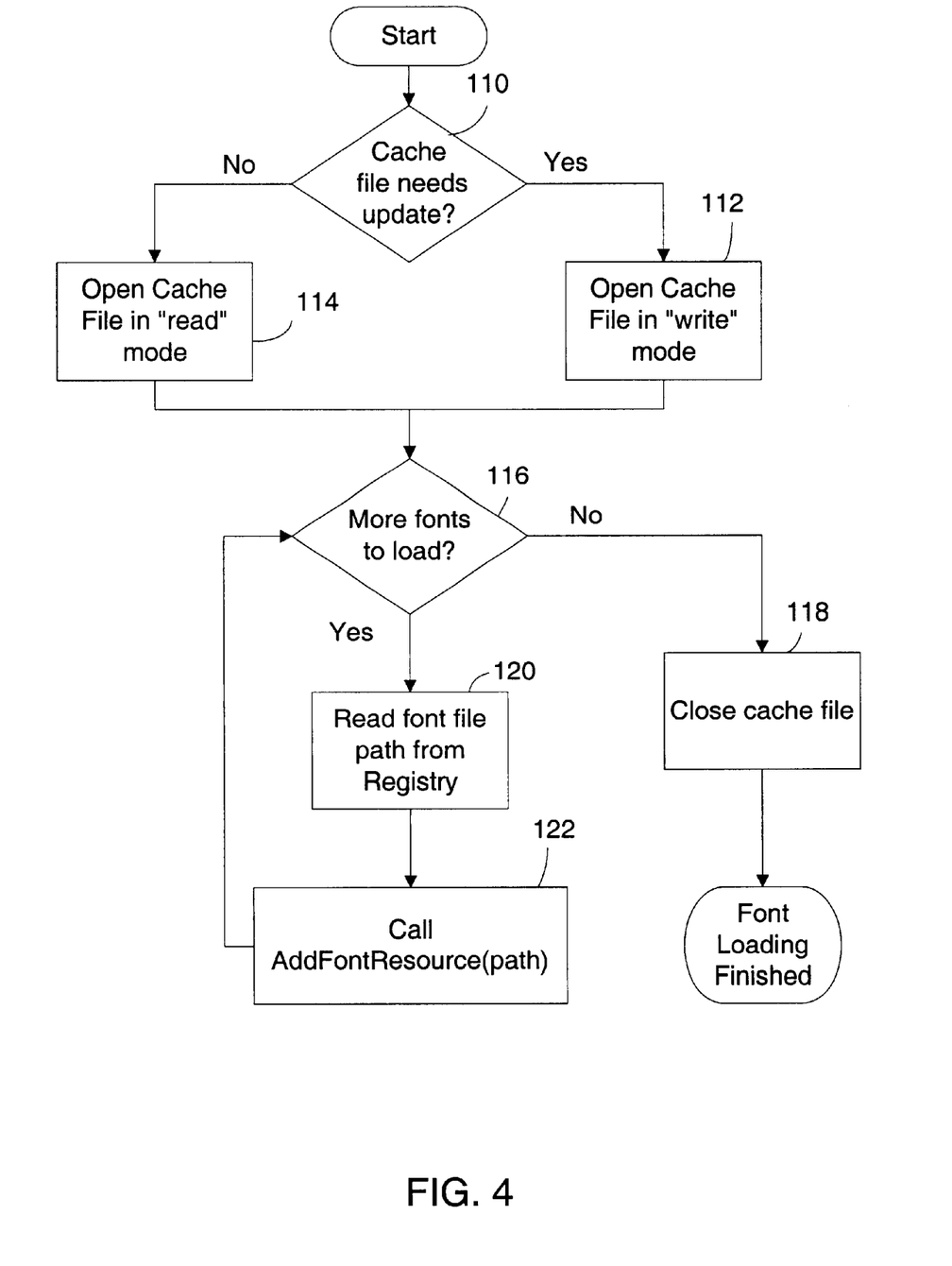
FIG. 4 is a flow diagram showing a process of loading fonts during the boot time.

FIG. 4 shows the process of utilizing the font-loading information cache 64 during the boot time of the computer system in the embodiment of FIG. 3 to speed up the font-loading process. During the initialization of the Win32 subsystem, the font-loading information cache is initialized. In this initialization process, the mode in which the font-loading information cache is opened is determined (step 110). The font-loading information cache may be in either the "read" or "write" mode. In the "read" mode, the font-loading information cache can be read but cannot be changed. In the "write" mode, the font-loading information cache can be read and can also be changed. Setting the mode of the font-loading information cache to "write" (step 112) indicates that the font-loading information cache needs to be updated. Otherwise the mode of the font-loading information cache is set to "read" (step 114).

The updating of the cache file may be required for various reasons. For example, if the set of installed fonts has changed since the last boot time, the cache file may have to be modified to reflect the changes. The font-loading information cache may also have to be updated when the locale of the computer system has changed. This is because the system-default language may-be changed (e.g., from English to Japanese), and the font-loading information extracted from the font files may be language dependent. The font-loading information cache may also have to be rebuilt if the GDI detects that cache file has been corrupted (such as by checking a checksum of the file) or full. Moreover, the information cached in the cache file may depend on the versions of the font drivers that are used to extract the information from the font files. Thus, if the version of any of the font driver has changed since the last boot, the cache file may have to be rebuilt.

After the font-loading information cache 64 is initialized and its mode set, it is determined whether there are more fonts to be loaded (step 116). If there is no more fonts to be loaded, the font-loading process is complete. The cache file 64 is then closed (step 118). On the other hand, if there are more fonts to be loaded, the path for the next font file is read from the Registry (step 120), and a call to the AddFontResource routine passing the font file path as an argument is made to load the font (step 122).

Figure 5:
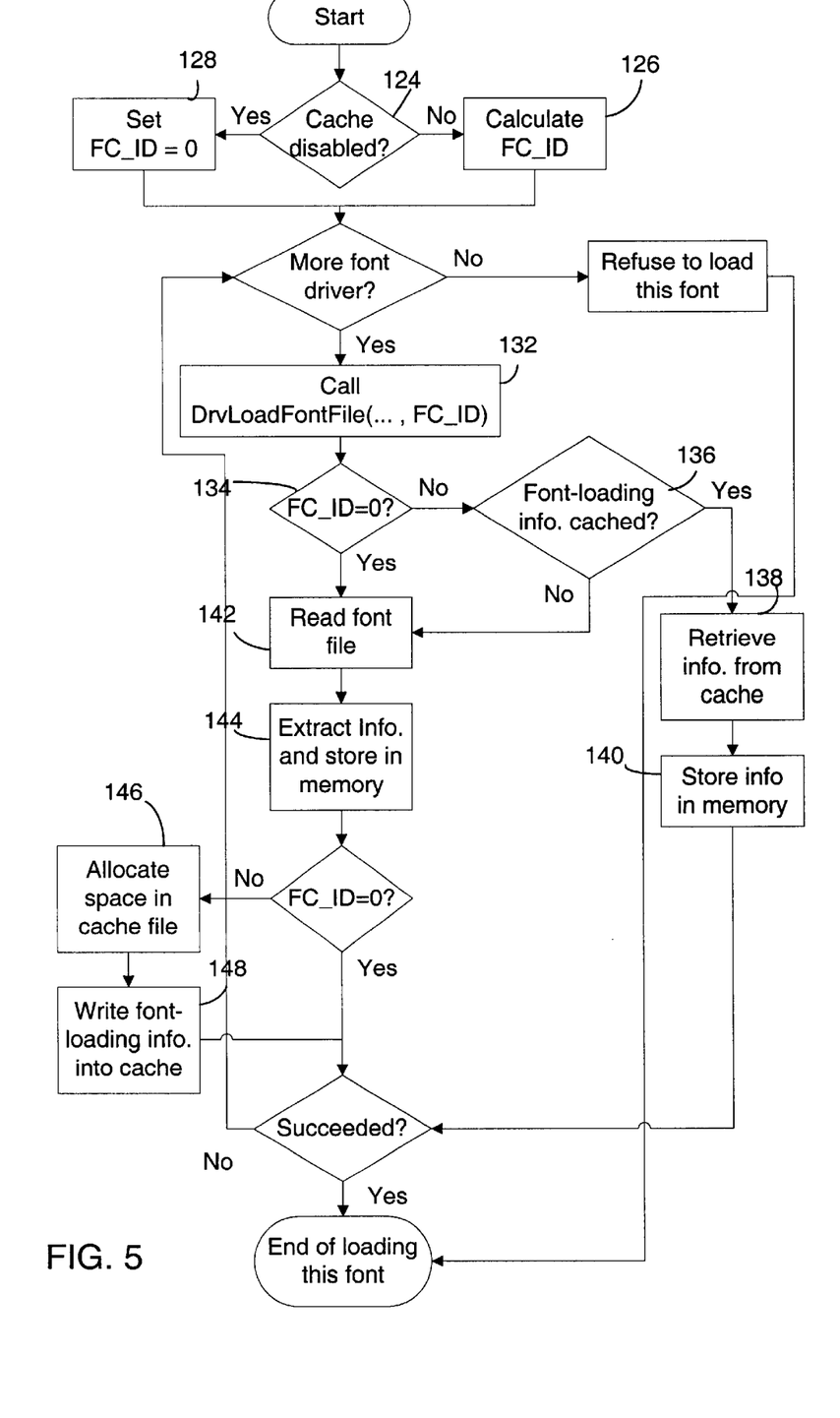
FIG. 5 is a flow diagram showing a process of speeding up the process of loading fonts by using a font-loading information cache.

The operations involved in carrying out the AddFontResource call utilizing the font-loading information cache to speed up the font-loading process is shown in FIG. 5. When the GDI receives the AddFontResource call, it first checks whether this call occurs during the boot process-or after the boot process is already completed (step 124). If the call is during the boot process, the GDI computes a font-caching identification number ("FC_ID") for identifying the font (step 126). Otherwise the font-caching ID is set to zero to indicate that the cache file is closed or disabled (step 128). The FC_ID is-first passed to an internal GDI routine that queries the font boot cache file 64 to find out if there is cached information in the cache file for this font and, if so, to find out which font driver supports this font. If the cached information is found, the GDI proceeds and asks only the appropriate font driver to load the font. To this end, a call is made to a DrvLoadFontFile routine, which is a routine in the DDI layer, using the font-caching ID as one of the parameters (step 132). The DrvLoadFontFile passes the font-caching ID to the font drivers. If the information is not cached for this font GDI still has to "offer" the font to every font driver.

When a font driver receives the font-caching ID, it determines whether the ID is zero (step 134). If the font-caching ID is non-zero, the font driver knows that the DrvLoadFontFile call is made during the boot process. The font driver will then attempt to obtain the font-loading information from-the font boot cache without opening the font file. Since the font driver does not know the contents of the font boot cache file, it has to determine first whether the font-loading information for that font has already been cached (step 136). In the embodiment of FIG. 3, this is accomplished by calling a function EngFntCacheLookup (FC_ID, &cbSize), where FC_ID is the font-caching ID, and cbSize is a variable for the size of the font-loading information. If the font-loading information for this font is in the cache file, EngFntCacheLookup returns a non-null pointer to the block of the size cbSize that stores the cached data. The font driver then proceeds to read the font-loading information from the cache file (step 138), and stores the information in the system memory (step 140), without having to read the font file.

If, however, EngFntCacheLookup returns a null pointer, the font driver knows that the font-loading information for that font has not been cached yet. In that case, the font driver proceeds to open and read the font file (step 142) to extract the font-loading information and save it in the memory (step 144) as it would if the font boot cache is not used. After the information has been extracted, the font driver will attempt to store the extracted information in the font boot cache for use in the next boot process. To that end, the font driver calls the routine EngFntCacheAlloc(FC_ID, cbSizeNeeded) to allocate the space in the font boot cache for storing the extracted information (step 146), where cbSizeNeeded is the size of memory needed to store the extracted font-loading information. If this call is successful, EngFntCacheAlloc returns a non-null pointer that points to the available block of memory of the size cbSizeNeeded in the cache file. The font driver can than write to the allocated memory space the data needed to cache the font (step 148). In this way, the font-loading data is made available in the cache file for loading the font during the next boot process.

If the font-caching ID passed to DrvLoadFontFile is zero (step 134), however, the font driver knows that the font boot cache file is closed at this time. In that case, it should not try to obtain the font-loading information from the font boot cache for loading the font, nor should it attempt to cache the font-loading information after it has extracted the information from the font file (step 144).

Figure 6:
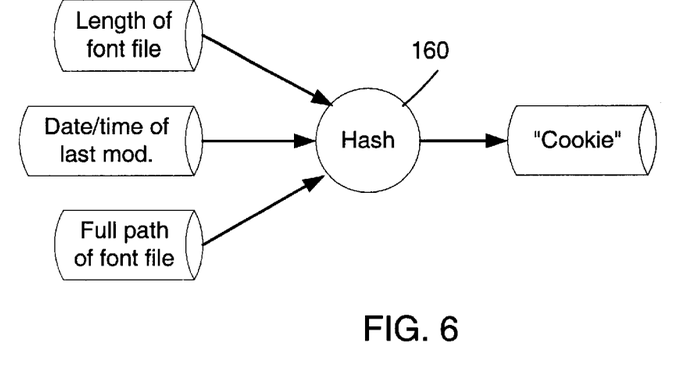
FIG. 6 is a schematic diagram showing the generation of a cache ID number for identifying a font.

In a preferred implementation, the font-caching ID generated by the GDI is a 32-bit number, which is called a "cookie." When a font file is added to the Win32, the GDI calculates a cookie number for the font. The cookie is recomputed for every permanently installed font during the boot time. This operation is very quick as compared to the amount of time required to load the font without the use of font-boot cache. As shown in FIG. 6, the cookie is generated by applying a cryptographic hash function 160 to the following data regarding the font file: the length of the font file, the date and time when the font file was last modified, and the full path of the font file. The cookie generated in this way provides a substantially unique identification number for the font within the relatively small set of fonts installed on the system (as compared to the set of all fonts in the "universe"). Because the cookie generated in this way is not guaranteed to be unique, it is possible for two installed fonts to have identical cookies. In such a case, which is called a collision, the system simply does not cache the font-loading information for either font. Because the likelihood of collision is very small, not caching information for both fonts has a very minor performance implication.

When the font-loading information cache file is in the "write" mode, the font driver may have to request more space to be allocated for the cache file so that cached data for more fonts can be stored. If the system fails to allocate more cache file space, the font driver can proceed to load the font without caching the data.

In accordance with a feature of the invention, the architecture for caching font-loading information can be used to speed up the font-loading process for various types of fonts regardless of the font technologies involved. This is because the font driver of each installed font is responsible for storing in the cache file and reading therefrom whatever information it needs to load the font that it would otherwise have to generate by reading the font file. This architecture is also flexible in that the caching does not have to be performed for each font. The decision of whether to store font-loading information in the cache may be made at the level of the font driver. For example, font drivers for some older font technologies, such as the Bitmap fonts and Vector fonts, may choose not to implement the caching scheme because they only load a small number of fonts. On the other hands, font drivers for newer font technologies such as the TrueType or ATM (or PostScript) fonts that often need to load a large number of fonts from large font files can achieve significant saving in the time required to load the fonts by caching the font-loading information.

The font-loading caching scheme in accordance with the invention has been described above in the context of booting a computer system. It will be appreciated, however, that the caching scheme is applicable whenever a pre-selected list of fonts is to be loaded. By way of example, the font-loading caching can be advantageously used in a remote terminal service environment in which multiple instances of the graphic component of the operating system have to be initialized.

Figure 7:
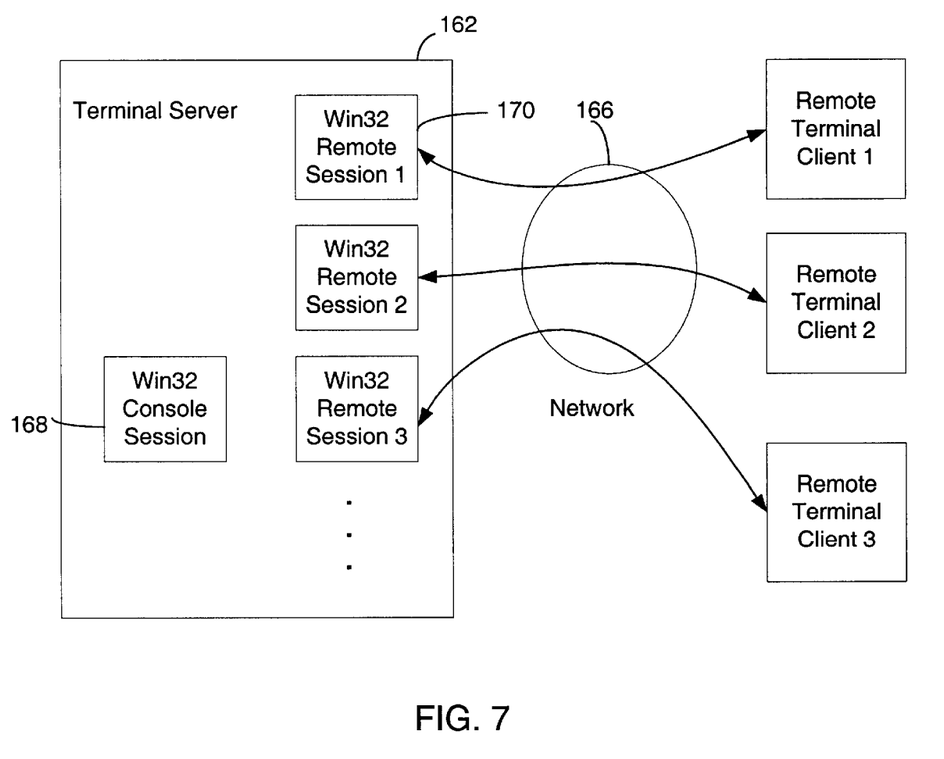
FIG. 7 is a schematic diagram showing a remote-terminal service system having a terminal server and a plurality of remote client computers.

FIG. 7 shows an embodiment of such a remote terminal service system. The remote terminal service system as illustrated in FIG. 7 includes a terminal server computer 162 and a plurality of client computers 164 that communicate with the terminal server across a network 166. Each of the client computers 164 serves the function of a remote terminal of the server computer for interfacing with a user. The client computer 164 functions as a "remote terminal" in the sense that the user actually works with the operating system and/or software applications residing on the server computer, and the client computer provides the input and output functionality for the server computer at a location remote from the server computer. The server computer 162 tells the client computer 164 what to display on its screen, and the input entered by the user through the client computer is transmitted to the server computer for processing thereby. This arrangement enables the user to use the operating system and application features and resources of the server computer while placing minimal requirements on the capabilities and resources of the client computer.

In the embodiment illustrated in FIG. 7, the server computer 162 runs the Windows NT operating system that has a Win32 subsystem. In this terminal service system, the Win32 instance 168 that is used to boot and run the terminal server 162 itself is called the "console" session. Once the operating system of the terminal server is initialized, it can run many (e.g., several hundred) remote terminal sessions at the same time. At the beginning of each remote terminal session, a separate instance 170 of the Win32 subsystem is initialized to handle, among other things, application management and graphics aspects of the session. Since GDI is one component of the Win32 subsystem, the initialization of each instance of the Win32 subsystem involves reloading all the fonts installed on the terminal server 162. When there are many remote terminal sessions, the terminal server may spend a large amount of time on reloading fonts. By allowing the remote sessions to use the font boot cache, the start up time for each session can be significantly reduced, and the load on the terminal server that supports the remote terminal sessions is also significantly reduced.

Figure 8:
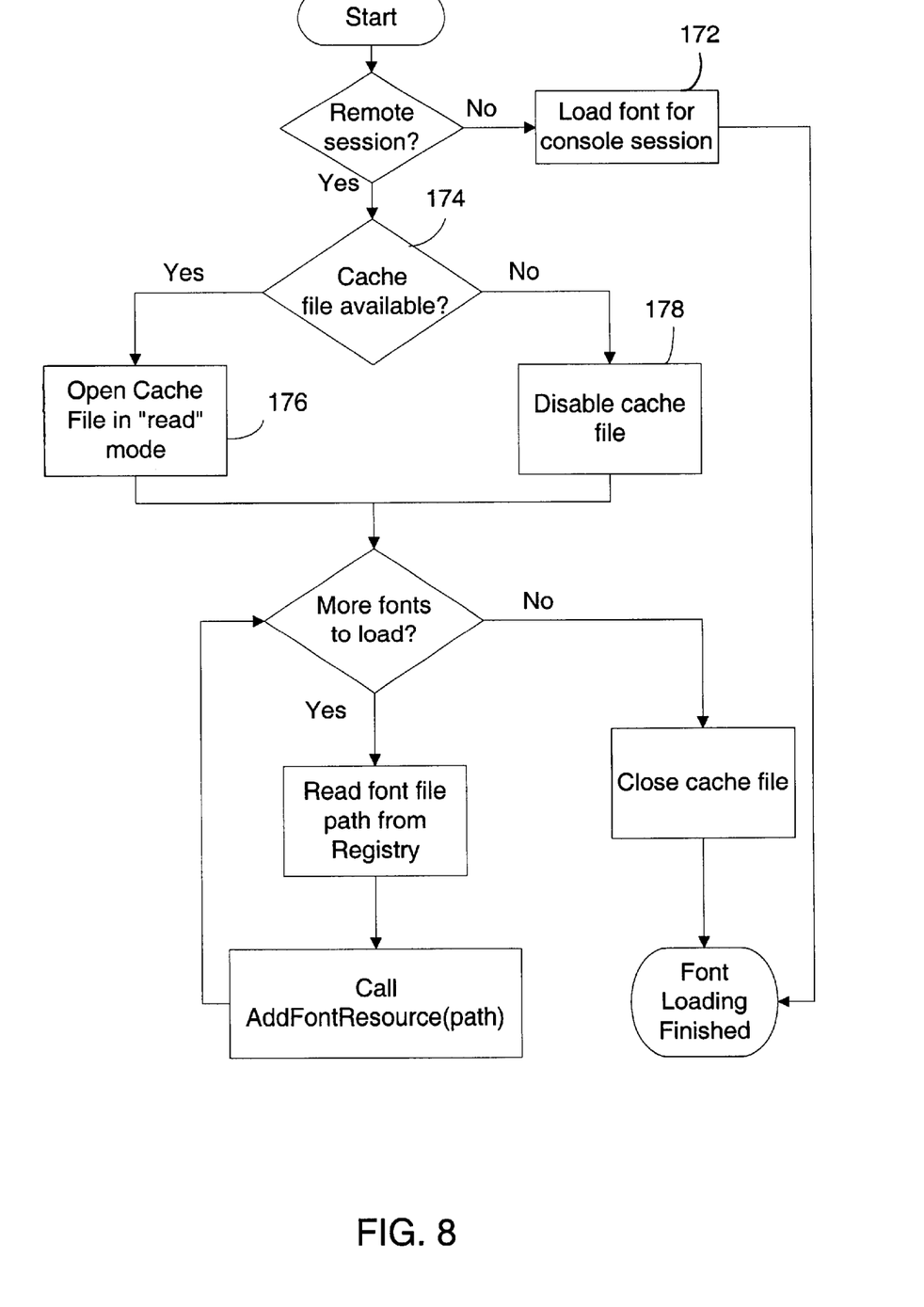
FIG. 8 is a flow diagram showing a process of loading fonts during the initialization of a remote terminal session.

FIG. 8 shows a process of loading fonts using the font-loading cache file for the console session and the remote terminal sessions. When the power of the terminal server is turned on, the Win32 instance 168 for the console session is initialized, and the installed fonts are loaded using the font boot cache (step 172). The font-loading operation in the console session is the same as that shown in FIGS. 4 and 5. The console session may or may not write to the cache, as described above. In a preferred embodiment, the updating status of the cache file 64 is indicated by an updating flag in the Registry. The updating flag is set to TRUE during the font-loading process of the console session when the cache file is being updated. Once the updating of the cache file is completed, the updating flag is reset to FALSE. The remote sessions are not allowed to use the cache file while the updating flag is set to TRUE.

The process of loading fonts in a-remote terminal session is very similar to that of the console session, with the difference that the remote session is not allowed to write to the cache file. Only the console session may write to the cache file. At the beginning of the remote session, it is determined whether the cache file should be used for loading fonts (step 174). The remote session-should not use the cache file if the console session has not completed updating the cache file, such as indicated by the updating flag in the Registry. The cache file may also be made unavailable to the remote session when, for example, the system locale has changed, the versions of the font drivers have changed, or the cache file was corrupted, such as indicated by its checksum. If the remote session is allowed to use the cache file, the cache file is opened in the "read" mode (step 176). Otherwise the cache file is disabled so that the remote session is not allowed to read from it (step 178). The AddFontResource call is then made to load the installed font (step 180), the operation of which has been described above in connection with FIG. 5.

In view of the foregoing, it can be seen that the present invention provides an architecture and method for loading fonts that uses a font-loading information cache to reduce the time required to load fonts during system boot time or when a graphic component of the operating system is initialized. The time saving achievable with the caching scheme of the invention is especially significant when many fonts are to be loaded and the font files are large. A significant advantage of the caching scheme is that it is applicable to various font technologies, because the caching and retrieval of the information is performed by the font drivers associated with the respective fonts. Moreover, the architecture for font-loading caching offers the flexibility that a choice can be made at the font driver level as to whether to implement the caching scheme.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for loading fonts installed on a computer, comprising:
    identifying a font from a list of installed fonts for loading;
    determining whether font-loading information for the font is stored in a cache file;
    if the font-loading information for the font is in the cache file, retrieving the font-loading information from the cache file;
    if the font-loading information for the font is not in the cache file, reading a font file for the font to extract the font-loading information; and
    loading the font using the font-loading information.

2. A computer-readable medium as in claim 1, including further computer-executable instructions for performing the step of storing the font-loading information extracted from the font file into the cache file.

3. A computer-readable medium as in claim 1, including further computer-executable instructions for performing the steps of:
    checking whether the computer is in a boot process; and
    enabling access to the cache file if the computer is in a boot process.

4. A computer-readable medium as in claim 1, wherein the step of determining whether the font-loading information for the font is stored in the cache file includes generating a font-caching identification for identifying the font to be loaded, and querying the cache file to determine whether the cache file contains font-loading information corresponding to the font-caching identification.

5. A computer-readable medium having computer executable components comprising:
    an operating system (OS) graphics component for handling graphics operations of the computer, the OS graphics component during an initialization process identifying a font to be loaded from a list of installed fonts and generating a request to load the font;
    a font driver component for loading said font in response to the request to load the font, the font driver checking a cache file to determine whether font-loading information for the font is stored in the cache file, if said font-loading information is in the cache file, retrieving the font-loading information from the cache file; and loading said font using the font-loading information.

6. A computer-readable medium as in claim 5, wherein the font driver component reads a font file for the font to extract the font-loading information if the font-loading information is not in the cache file.

7. A computer-readable medium as in claim 5, wherein the OS graphics component generates a font-caching identification for the font as a parameter of the request, and the font driver component uses the font-caching identification to determine whether the font-loading information for the font is in the cache file.

8. A computer-readable medium as in claim 7, wherein the OS graphics component generates the font-caching identification from data including a path of a font file for the font.

9. A method of loading fonts installed on a computer, comprising the steps of:
    identifying from a list of installed fonts a font to be loaded;
    requesting a font driver associated with the font to load the font;
    checking, by the font driver, whether font-loading information for the font is stored in a cache file;
    if the font-loading information for the font is in the cache file, retrieving by the font driver the font-loading information for the font from the cache file; and
    loading the font using the font-loading information.

10. A method as in claim 9, further including the step of calculating a font-caching identification for the font, and wherein the step of requesting passes the font-caching identification to the font driver, and the step of checking determines whether font-loading information corresponding to the font-caching identification is stored in the cache file.

11. A method as in claim 9, further including the steps of: if the font-loading information for the font is not in the cache file,
    reading a font file for the font to extract the font-loading information; and
    storing the font-loading information for the font into the cache file.

12. A computer-readable medium having computer-executable instructions for performing steps for loading fonts installed on a remote terminal server, comprising:
    during a console session:
        identifying a font from a list of installed fonts for loading;
        determining whether font-loading information for the font is stored in a cache file;
        if the font-loading information for the font is in the cache file, retrieving the font-loading information from the cache file;
        if the font-loading information for the font is not in the cache file, reading a font file for the font to extract the font-loading information, and storing the font-loading information extracted from the font file into the cache file; and
    during a remote terminal session:
        identifying a font from the list of installed fonts for loading;
        determining whether font-loading information for the font is stored in the cache file;
        if the font-loading information for the font is in the cache file, retrieving the font-loading information from the cache file;
        if the font-loading information for the font is not in the cache file, reading a font file for the font to extract the font-loading information; and
        loading the font using the font-loading information.

13. A computer-readable medium as in claim 12, including further computer-executable instructions for performing the step of determining during the remote terminal session whether the cache file is available for retrieval of font-loading information.

14. A computer-readable medium as in claim 13, wherein the step of determining whether the cache file is available includes determining whether the cache file is being updated in the console session.

* * * * *